United States Patent
Kawasuji et al.

(10) Patent No.: US 6,535,540 B1
(45) Date of Patent: Mar. 18, 2003

(54) DISCHARGE DEVICE FOR PULSED LASER

(75) Inventors: Yasufumi Kawasuji, Oyama (JP); Takashi Matsunaga, Oyama (JP)

(73) Assignee: Komatsu Ltd., Tokyo (JP)

( * ) Notice: Subject to any disclaimer, the term of this patent is extended or adjusted under 35 U.S.C. 154(b) by 80 days.

(21) Appl. No.: 09/660,830

(22) Filed: Sep. 13, 2000

(51) Int. Cl.$^7$ ............................................... H01S 3/097
(52) U.S. Cl. ..................... 372/86; 372/38.1; 372/38.02; 372/38.05
(58) Field of Search ........................... 372/38.1, 38.02, 372/86, 38.04, 38.05

(56) References Cited

U.S. PATENT DOCUMENTS

| | | | | |
|---|---|---|---|---|
| 4,802,185 A | * | 1/1989 | Kyusho ........................ | 372/86 |
| 5,048,045 A | * | 9/1991 | Noda et al. ................... | 372/86 |
| 5,097,472 A | * | 3/1992 | Chenausky .................. | 372/86 |
| 5,142,547 A | * | 8/1992 | Cirkel et al. .................. | 372/86 |
| 5,181,217 A | * | 1/1993 | Sato et al. .................... | 372/86 |
| 5,305,339 A | * | 4/1994 | Nakatani et al. ............. | 372/86 |
| 5,309,462 A | * | 5/1994 | Taylor et al. ................. | 372/86 |
| 5,313,487 A | * | 5/1994 | Fujikawa et al. ............. | 372/86 |
| 5,708,676 A | * | 1/1998 | Minamitani et al. ......... | 372/86 |
| 5,754,579 A | * | 5/1998 | Mizoguchi et al. .......... | 372/86 |
| 6,188,144 B1 | * | 2/2001 | Kawasuji ................. | 372/38.08 |

* cited by examiner

*Primary Examiner*—Leon Scott, Jr.
(74) *Attorney, Agent, or Firm*—Welsh & Katz, Ltd.

(57) ABSTRACT

In a preionization discharge circuit 10, when a switch SW14 is turned on, an electric current i10 from a constant current source 13 flows through a loop of a coil L12, en electrode 11A and the switch SW14. When it is assumed that an inductance of the coil L12 is L (H) and the current i10 flowing through the coil L12 is I (A), energy EL of $(1/2) \cdot L \cdot I^2$ is accumulated in the coil 12. Meanwhile, in a preionization discharge control section 40, a preionization discharge timing signal (namely, a corona emission timing signal) Ydt is output to the switch SW14 after lapse of a time ty (=Tds−tyd) after a pulse oscillation synchronizing signal TRL is received so that preionization discharge is caused earlier by a preset time tyd than the preionization discharge timing signal Ydt. When the switch SW14 is switched from on to off according to the corona emission timing signal Ydt, the energy EL accumulated in the coil L12 is abruptly supplied to the electrode 11A of the preionization electrode 11. Then, an electric field is produced between the electrode 11A and an electrode plate 11C and, when the electric field of the preionization electrode 11 rises to a predetermined preionization start electric field, a corona discharge is produced in a tube 11B as a dielectric of the preionization electrode 11 to flow an electric current i11, and a main discharge gap 3 is preionized before the main discharge is caused by main discharge electrodes 1 and 2.

6 Claims, 9 Drawing Sheets

DISCHARGE DEVICE FOR PULSED LASER

BACKGROUND OF THE INVENTION

1. Field of the Invention

The present invention relates to a discharge device for pulsed laser which performs pulsed laser oscillation by preionizing across main discharge electrodes disposed in a laser medium and performing a main discharge to excite the laser medium.

2. Description of the Prior Art

TEA laser causes a uniform glow discharge across a pair of opposing main discharge electrodes to form an inverted population region necessary for laser oscillation.

To obtain the glow discharge spread to fill the entire main discharge gap, the TEA laser has to cause preionization before starting the main discharge to ionize the entire main discharge gap previously. Especially, an excimer laser has to ionize as many as possible immediately before the main discharge because the electrons in a negative gas have a short lifetime.

Currently, various types of methods using X rays, a spark discharge, a corona discharge or the like are used as a preionizing method. Among them, a method using the corona discharge is extensively used because it is relatively simple and easy and has less contamination of a laser gas.

Figure 8:
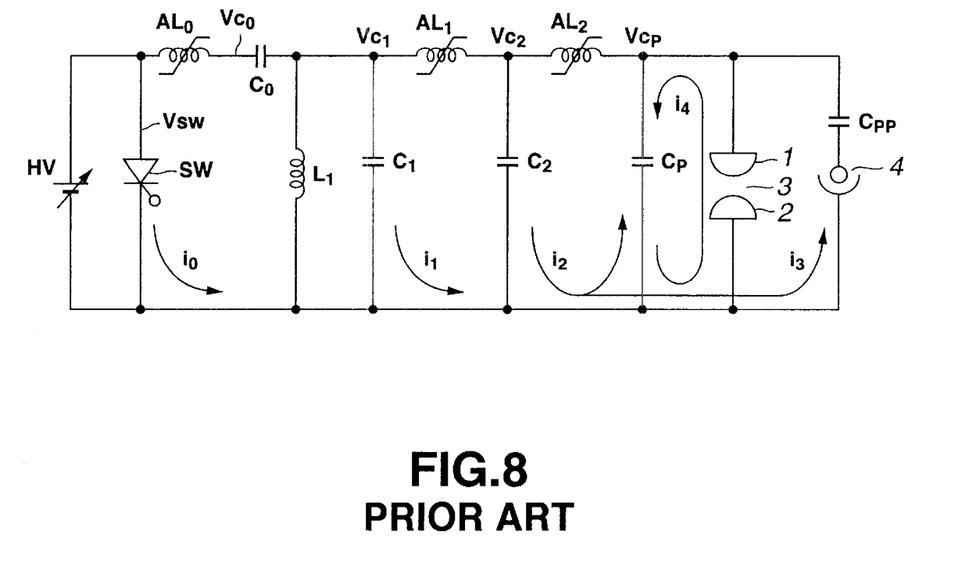
FIG. 8 is a diagram showing a structure of a conventional discharge device for pulsed laser.
Figure 9:
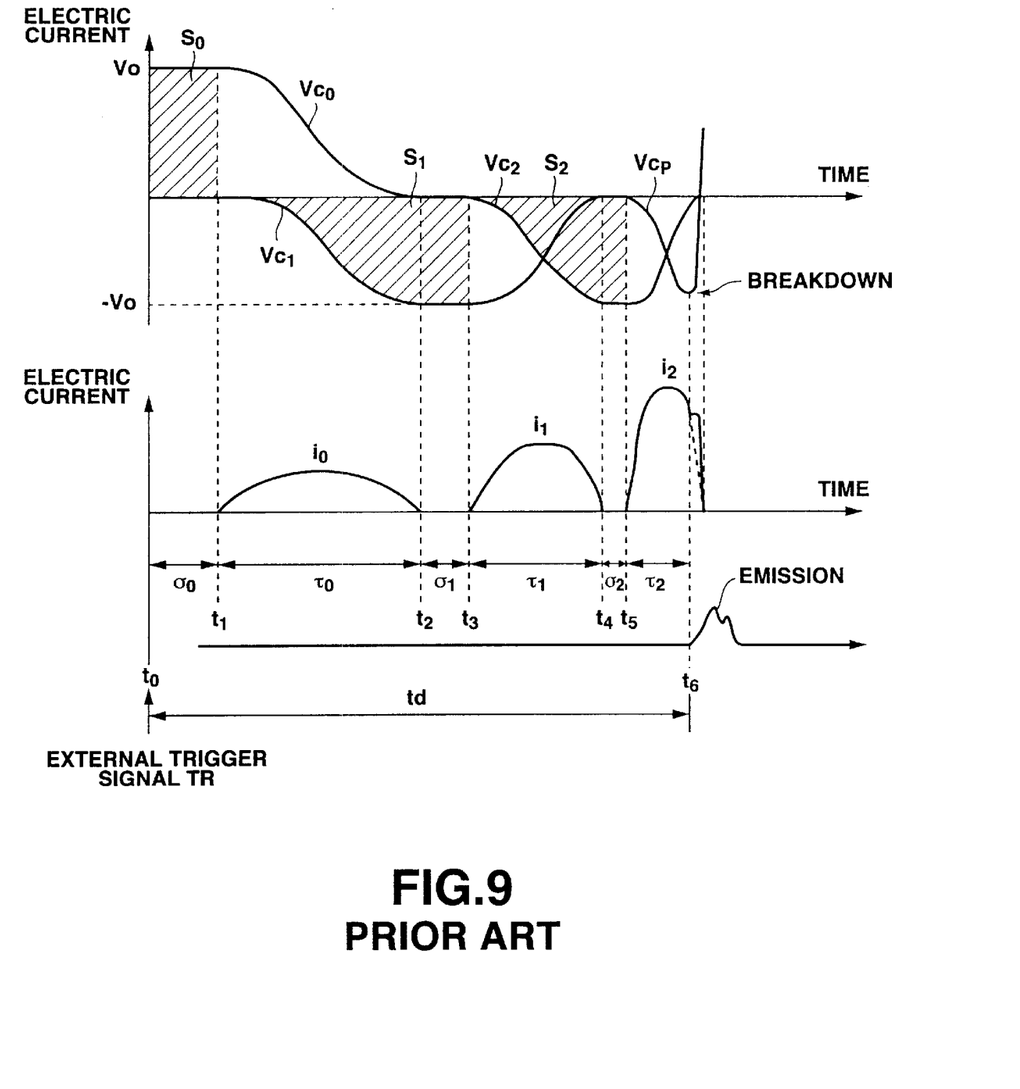
FIG. 9 is a diagram showing voltage and current waveforms at respective points of a magnetic pulse compression circuit of the conventional discharge device for pulsed laser.

FIG. 8 shows an equivalent circuit of a conventional capacity shift type magnetic pulse compression discharge device, namely of a discharge device for pulsed laser, which employs the corona discharge for the preionization. FIG. 9 shows an example of voltage and electric current waveforms at respective points of the discharge device for pulsed laser shown in FIG. 8.

In the discharge device for pulsed laser shown in FIG. 8, corona preionization capacitor (hereinafter called the preionization capacitor) Cpp and corona preionization electrode (hereinafter called the preionization electrode) 4 are disposed to preionize in main discharge gap 3 which is formed across a pair of main discharge electrodes 1, 2, and a laser medium in the main discharge gap 3 across the main discharge electrodes 1, 2 is preionized by UV (ultraviolet) light produced by a corona discharge at the preionization electrode 4.

The discharge device for pulsed laser shown in FIG. 8 has two-stage magnetic pulse compression circuit utilizing a saturation phenomenon of three magnetic switches AL0 to AL2 each made of a saturable reactor.

In the discharge device for pulsed laser shown in FIG. 8, an electric charge is applied from high-voltage power source HV to capacitor C0 through the magnetic switch AL0 and coil L1.

Then, when pulse oscillation synchronizing signal (trigger signal) TR, which is turned on in synchronization with a repetition frequency of a pulsed laser oscillation, is input, main switch SW is turned on (at time t0 shown in FIG. 9). When the main switch SW is turned on, electric potential VSW of the main switch SW drops sharply to zero. When time integral (namely, time integral value of voltage VC0) S0 of voltage difference "VC0–VSW" between the capacitor C0 and the main switch SW as voltages at both ends of the magnetic switch AL0 reaches a threshold value which is based on a set characteristic of the magnetic switch AL0, the magnetic switch AL0 is saturated at time tl, and electric current pulse i0 flows through a loop of the capacitor C0, the magnetic switch AL0, the main switch SW and capacitor C1.

Duration τ0 in which the electric current pulse i0 starts to flow and becomes 0 (time t2 shown in FIG. 9), namely electric charge transfer time τ0 in which the electric charge is completely transferred from the capacitor C0 to the capacitor C1, is based on respective capacitance of the inductance, the capacitor C0 and the capacitor C1 after the magnetic switch AL0 is saturated with loses due to the main switch SW and the like disregarded.

Meanwhile, when time product S1 of the voltage VC1 of the capacitor C1 reaches the threshold value which depends on the set characteristic of the magnetic switch AL1, the magnetic switch AL1 is saturated and has a low inductance at time t3. Thus, electric current pulse i1 flows through a loop of the capacitor C1, capacitor C2 and the magnetic switch AL1. The electric current pulse i1 becomes 0 at time t4 after a lapse of predetermined transfer time τ1 which is determined by an inductance after the saturation of the magnetic switch AL1 and the capacitance of the capacitors C1, C2.

When time product S2 of voltage VC2 of the capacitor C2 reaches a threshold value which is based on a set characteristic of the magnetic switch AL2, the magnetic switch AL2 is saturated at time t5. Thus, electric current pulse i2 flows through a loop of the capacitor C2, peaking capacitor CP and the magnetic switch AL2. The flow of the electric current pulse i2 rises voltage Vcp of the peaking capacitor Cp and voltage VCpp of the preionization capacitor Cpp.

Then, when the voltage of the preionization electrode 4 rises to a predetermined preionization start voltage through the preionization capacitor Cpp, a corona discharge is caused at the preionization electrode 4 to flow electric current i3, and the main discharge gap 3 is preionized.

Besides, the voltage VCp of the peaking capacitor Cp rises further with the progress of charging. And, when the voltage VCp reaches a predetermined main discharge start voltage, a laser gas between the main discharge electrodes 1, 2 is undergone an electrical breakdown at time t6, and a main discharge is started across the main discharge electrodes 1, 2 to flow electric current i4. The laser medium is excited by the main discharge caused across the main discharge electrodes 1, 2, and laser light is emitted in several nsec.

Then, the voltages of the peaking capacitor Cp and the preionization capacitor Cpp drop sharply owing to the main discharge and return to the states before the charging was started after a lapse of a predetermined period.

Such a discharge operation is repeated by the switching operation of the main switch SW which is synchronized with the trigger signal TR to perform pulsed laser oscillation at a predetermined repetition frequency (namely, a pulse oscillation frequency).

In such a case, because it is determined that the electric charge transfer circuit of each stage which is comprised of the magnetic switch and the capacitor has smaller inductance toward later stages, the pulse compression operation is performed so that the peak values of the electric current pulses i0 to i2 become high sequentially and the electrifying duration becomes shorter sequentially. As a result, an intense discharge is caused across the main discharge electrodes 1, 2 in a short period of time.

In the magnetic pulse compression circuit, duration td (hereinafter called the emission delay time) from the time t0 when the trigger signal TR is input and the main switch SW is turned on to the time t6 when the laser light is actually emitted depends on electrifying widths τ0, τ1, τ2 of the electric current pulses i0, 01, i2 and saturation time σ0, (τ0+σ1), (τ1+σ2) of the respective magnetic switches AL0 to AL2.

The electrifying widths (electric charge transfer time) τ0, τ1, τ2 are based on the inductance of the magnetic switch and the capacitance of the capacitor included in the electric charge transfer circuits of the respective stage, and such values are greatly influenced by the atmosphere temperature of the magnetic pulse compression circuit.

Besides, variations σ0, σ1, σ2 in the saturation time are based on a time integral of the voltage applied to the respective magnetic switches AL0 to AL2, so that they are greatly influenced by the voltage V0 of the high-voltage power source HV.

A discharge device other than the discharge device for pulsed laser shown in FIG. 8 is disclosed in Japanese Patent Application No. 9-271207 (Laid-Open Publication No. 11-112300) filed in Japan in the name of the applicant of this patent application.

Density Ne0 of electrons produced by the preionization and its spatial distribution have an influence upon the growth and stability of a glow discharge in the high-pressure laser gas. And, they are included in the factors which exert an influence upon the laser output power, the spatial intensity distribution of the laser beam, the pulse width and the like.

With the increase of the electron density Ne0, the generation and maintenance of the stable glow discharge are facilitated, and the laser output power obtained is also increased.

But, in the above conventional discharge device for pulsed laser, the main discharge (namely, the glow discharge) by the main discharge electrodes 1, 2 is started in a state that the preionization in the main discharge gap by the corona discharge is not performed sufficiently, namely in a state before reaching the aforesaid electron density Ne0 with that the stable glow discharge can be caused and maintained. Therefore, the stability and oscillation efficiency of the energy of the pulsed laser light subject to a pulse oscillation are degraded.

In other words, the preionization capacitor Cpp is connected to the peaking capacitor Cp, so that the preionization capacitor Cpp is also charged in synchronization with the charging to the peaking capacitor Cp.

Therefore, emission timing of the corona discharge (preionization discharge) by the preionization electrode 4 depends on the voltage applied to the main discharge electrodes 1, 2, and the duration between the corona discharge by the preionization electrode 4 and the main discharge by the main discharge electrodes 1, 2 becomes short.

Accordingly, the main discharge (namely, the glow discharge) by the main discharge electrodes 1, 2 is started before the aforesaid electron density Ne0 in the main discharge gap 3 reaches an electron density with that the stable glow discharge can be caused and maintained.

Especially, in view of the energy stability and the luminous efficiency, the pulse width of the voltage applied to the main discharge electrode tends to become short by the high-repetitive oscillation of the excimer laser, and the emission timing of the preionization also tends to be close to the main discharge start time.

Therefore, the emission timing of the actual preionization might deviate from the emission timing of the optimum preionization, and the energy stability and the luminous efficiency might be degraded.

As described above, the conventional discharge device for pulsed laser has a short duration between the corona discharge by the preionization electrode 4 and the main discharge by the main discharge electrodes 1, 2. Therefore, the main discharge is caused with the preionization in an insufficient state, and the energy stability of the pulsed laser light and the high oscillation efficiency cannot be obtained.

OBJECTS AND SUMMARY OF THE INVENTION

The present invention has been achieved in view of the circumstances described above, and it is an object of the invention to provide a discharge device for pulsed laser which has the main discharge by main discharge electrodes and the preionization discharge by a preionization electrode realized by a separate discharge system and can set an emission timing of the preionization by the preionization electrode arbitrarily.

Accordingly, a first aspect of the present invention is directed to a discharge device for pulsed laser, which comprises main discharge means having main discharge electrodes disposed in a laser medium, a main discharge capacitor connected in parallel with the main discharge electrodes, a magnetic pulse compression circuit which is connected in parallel with the main discharge capacitor and has a saturable reactor and a forwarding capacitor connected in series, and a power source for supplying electric charges to the forwarding capacitor, and which generates pulsed laser by transferring the electric charges accumulated in the forwarding capacitor according to a preset pulse oscillation synchronizing signal to the main discharge capacitor by utilizing a magnetic saturation phenomenon of the saturable reactor to cause a pulse discharge across the main discharge electrodes so to excite the laser medium, wherein:

preionization means for causing preionization across the main discharge electrodes is disposed to discharge independent of the main discharge means; and preionization is caused across the main discharge means by the preionization means before the main discharge is caused by the main discharge means.

Figure 1:
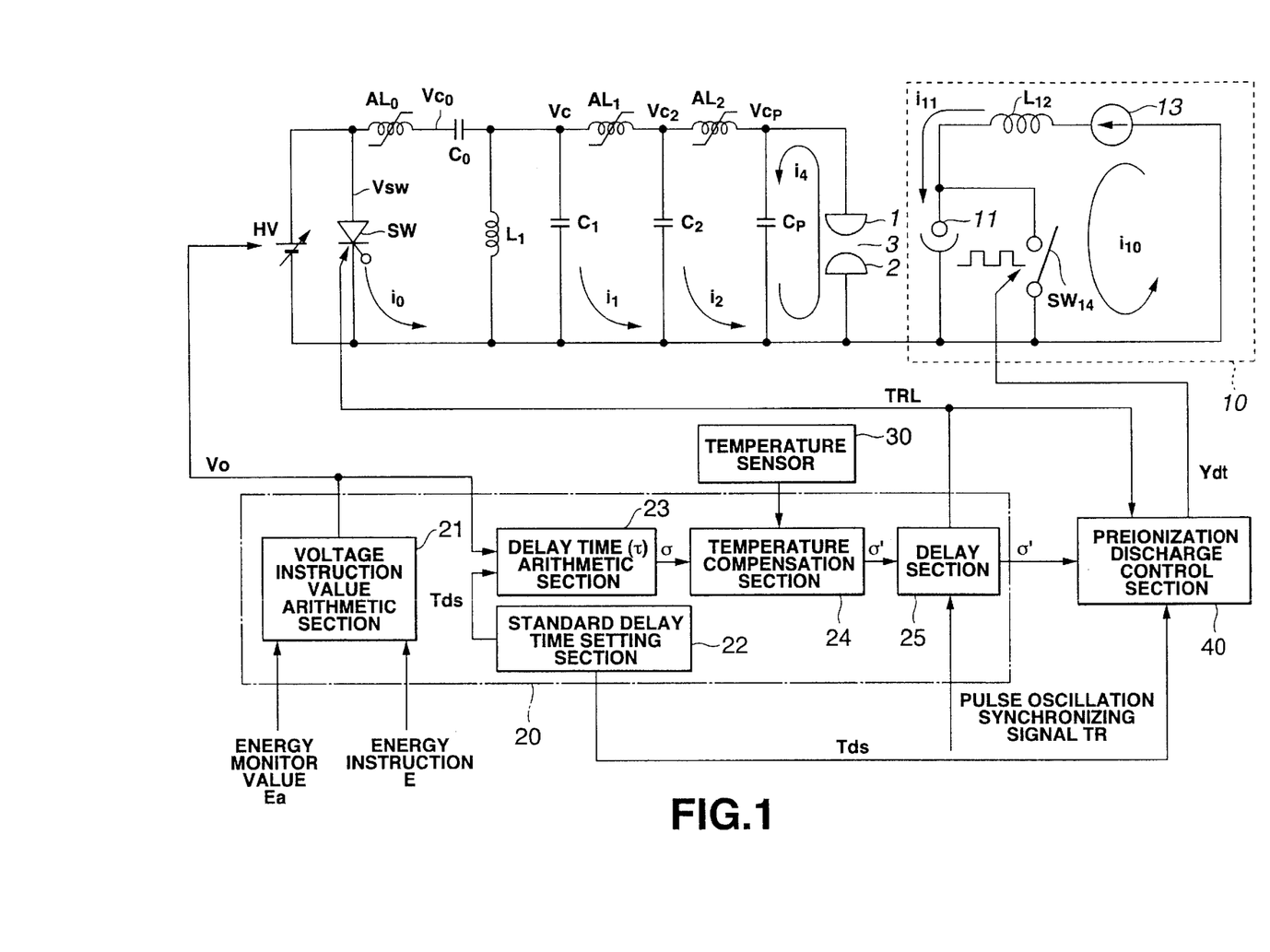
FIG. 1 is a circuit diagram showing an equivalent circuit of a discharge device for pulsed laser according to an embodiment of the invention.

According to the first aspect of the invention, the equivalent circuit of the main discharge circuit section (corresponding to the main discharge means) has high-voltage power source HV, main switch SW, four capacitors C0, C1, C2, Cp and main discharge electrodes 1, 2 as shown in FIG. 1. And, there are formed a first stage electric charge transfer circuit which forms electric current loop i0 from the capacitor C0 to the capacitor 1 through magnetic switch AL0 and the main switch SW, a second stage electric charge transfer circuit which forms electric current loop i1 from the capacitor C1 to the capacitor C2 through magnetic switch AL1, and a third stage electric charge transfer circuit which forms electric current loop i2 from the capacitor C2 to the peaking capacitor (namely, main discharge capacitor) Cp through magnetic switch AL2.

This equivalent circuit has a two-stage magnetic pulse compression circuit utilizing a saturation phenomenon of the three magnetic switches AL0 to AL2 made of the saturable reactor. And, the capacitors C1, C2 function as the aforesaid forwarding capacitor. Besides, the magnetic switches AL1, AL2 function as the aforesaid saturable reactor.

The main discharge circuit section and the preionization discharge circuit (corresponding to the above preionization discharge means) 10 are designed to have a discharge system formed of an independent circuit structure.

Figure 5:
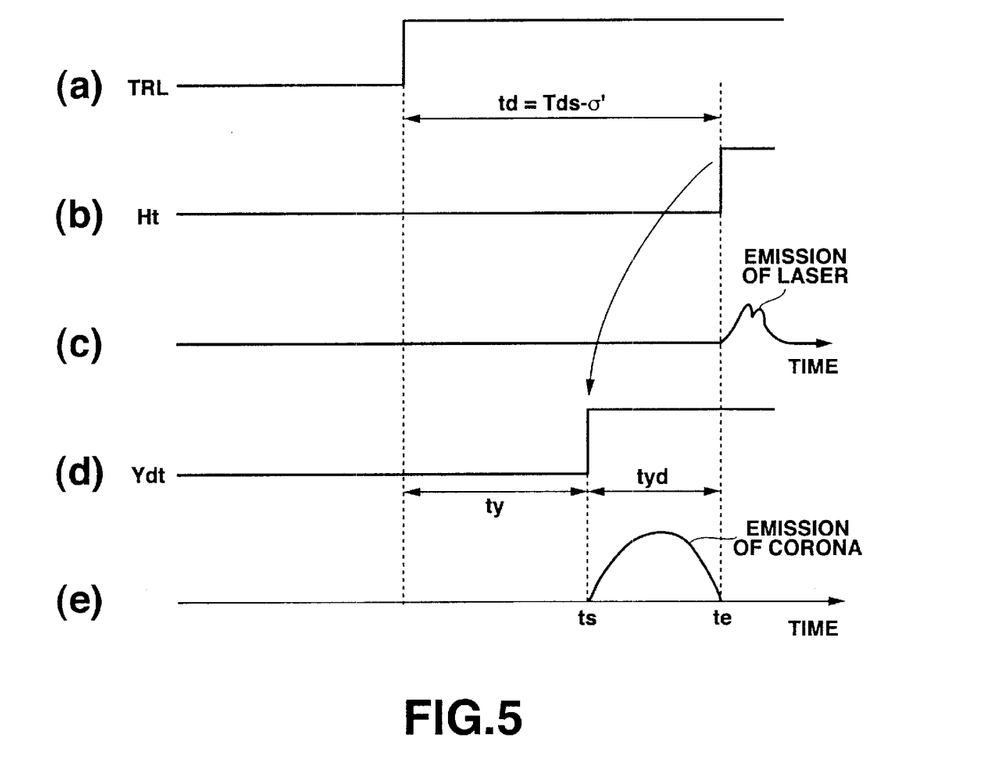
FIG. 5 is a time chart for illustrating the emission timing of a preionization discharge (e.g., a corona discharge) by the preionization discharge control section.

The preionization discharge circuit 10 causes preionization of the main discharge gap 3 at an arbitrary determined moment when the main discharge by the above main discharge circuit section is not caused yet (FIG. 5).

Therefore, according to the first aspect of the invention, the emission timing of the preionization discharge (namely, the corona discharge) is not limited to that of the main discharge but can be determined arbitrarily.

A second aspect of the invention is directed to the discharge device for pulsed laser according to claim 1, wherein the preionization means comprises:

A preionization electrode for preionizing;

induction type energy accumulation means for accumulating energy to cause a preionization discharge by the preionization electrode;

supply means for supplying energy to the energy accumulation means; and switching means which performs a switching operation in correspondence with the pulse oscillation synchronizing signal to supply energy from the supply means to the energy accumulation means and to supply the energy accumulated in the energy accumulation means to the preionization electrode.

According to the second aspect of the invention, in the equivalent circuit of the preionization discharge circuit 10, preionization electrode 11 for preionizing the main discharge gap 3, coil L (corresponding to the aforesaid induction type energy accumulation means) 12 as an induction type energy accumulation circuit, and constant current source (corresponding to the supply means) 13 are connected in series as shown in FIG. 1. And, switch SW (corresponding to the switching means) 14, which is a switching element such as an insulated gate bipolar transistor (IGBT), a gate turn-off thyrister (GTO thyrister) or a thyratron to make a switching operation according to the predetermined timing, is connected in parallel to the preionization electrode 11.

According to the second aspect of the invention, the coil L12 can increase a voltage rising rate (dV/dt) as compared with the case of the preionization capacitor Cpp (see FIG. 8) used for the conventional discharge device for pulsed laser. Therefore, a corona emission intensity to the same input energy can be increased, and additional preionization can be performed in the main discharge gap 3.

A third aspect of the invention relates to the first or second aspects of the invention which further comprises predicting means for predicting a start moment of a main discharge by the main discharge electrodes; and control means for controlling the preionization means so that preionization is caused across the main discharge electrodes earlier by a preset time than the start moment of the main discharge predicted by the predicting means.

A fourth aspect of the invention relates to the second aspect of the invention which further comprises:

predicting means for predicting a start moment of the main discharge by the main discharge electrodes; and control means for controlling the switching means so that preionization is caused across the main discharge electrodes earlier by a preset time than the start moment of the main discharge predicted by the predicting means.

According to the third aspect of the invention, preionization discharge control section (corresponding to the aforesaid prediction means and control means) 40 predicts a start moment (laser emission moment) of the main discharge by the aforesaid main discharge circuit section, and particularly by the main discharge electrodes 1, 2, according to pulse oscillation synchronizing signal TRL output from laser controller 20 and delay time δ' and outputs a signal indicating the predicted laser emission moment, namely preionization discharge timing signal Ydt, to the preionization discharge circuit section 10.

The preionization discharge control section 40 has a memory table in which data indicating the standard delay time Tds is stored, and recognizes that a value obtained by subtracting the delay time δ' from the standard delay time Tds is actual emission delay time td and that a value obtained by adding the actual emission delay time td from a rising moment of the pulse oscillation synchronizing signal TRL is an emission moment of the laser light.

And, when the preionization discharge control section 40 recognizes that the laser emission is performed after a lapse of the actual emission delay time td (=standard delay time Tds−delay time δ') as shown in FIGS. 5(b), (c) from the rising moment of the pulse oscillation synchronizing signal TRL as shown in FIG. 5, (a), the control section 40 outputs the preionization discharge timing signal Ydt to the main switch SW14 so to cause preionization discharge (corona discharge) earlier by predetermined time tyd than the moment of the laser emission as shown in FIGS. 5, (d), (e).

According to the third and fourth aspects of the invention, the emission timing of the preionization discharge (namely, the corona discharge) can be determined arbitrarily without being restricted by the emission timing of the main discharge. Thus, the emission of the corona discharge can be made when the main discharge is caused after the preionization is sufficiently caused in the main discharge gap.

A fifth aspect of the invention relates to the discharge device for pulsed laser according to the fourth aspect of the invention, wherein the predicting means comprises:

voltage compensating means for compensating variations in an actual emission moment of the pulsed laser due to a change in a power-supply voltage depending on a voltage instruction value to the power source;

temperature compensating means for compensating variations in the actual emission moment of the pulsed laser due to a change in an atmosphere temperature in the magnetic pulse compression circuit; and actual emission moment predicting means for predicting the actual emission moment of the pulsed laser according to the actual emission moment compensated by the voltage compensating means and the actual emission moment compensated by the temperature compensating means; and wherein the predicting means recognizes the actual emission moment predicted by the actual emission moment predicting means as a start moment of the main discharge.

According to the fifth aspect of the invention, laser controller 20, temperature sensor 30 and preionization discharge control section 40 provide the function of the aforesaid predicting means, and the preionization discharge control section 40 also has the function of the above control means. Besides, voltage instruction value arithmetic section 21, standard delay time setting section 22 and delay time arithmetic section 23 provide the function of the aforesaid voltage compensation means, and the temperature sensor 30 and temperature compensation section 24 provide the function of the above temperature compensation means. Delay section 25 produces pulse oscillation synchronizing signal TRL with compensation of variations in actual emission moment of the pulsed laser due to a change in power-supply voltage corresponding to the voltage instruction value and a change in atmosphere of the magnetic pulse compression circuit.

The preionization discharge control section (corresponding to the actual emission moment predicting means of the predicting means) 40 recognizes that the laser emission is performed after a lapse of the above actual emission delay time td (=standard delay time Tds−delay time δ') as shown in FIGS. 5(b), (c) from the rising moment of the pulse oscillation synchronizing signal TRL as shown in FIG. 5, (a).

According to the fifth aspect of the invention, the actual emission moment of the laser light can be predicted considering variations in actual emission moment of the pulsed laser due to a change in power-supply voltage according to the voltage instruction value and a change in atmosphere of the magnetic pulse compression circuit, and the preionization discharge can be caused earlier by a predetermined period than the predicted actual emission moment.

A sixth aspect of the invention relates to the discharge device for pulsed laser according to the second aspect of the invention, wherein:

the preionization means has the switching means, the preionization electrode, the energy accumulation means and the supply means connected in series; and one end of the preionization electrode is connected to the switching means and the other end of the preionization electrode is connected to the energy accumulation means.

Figure 2:
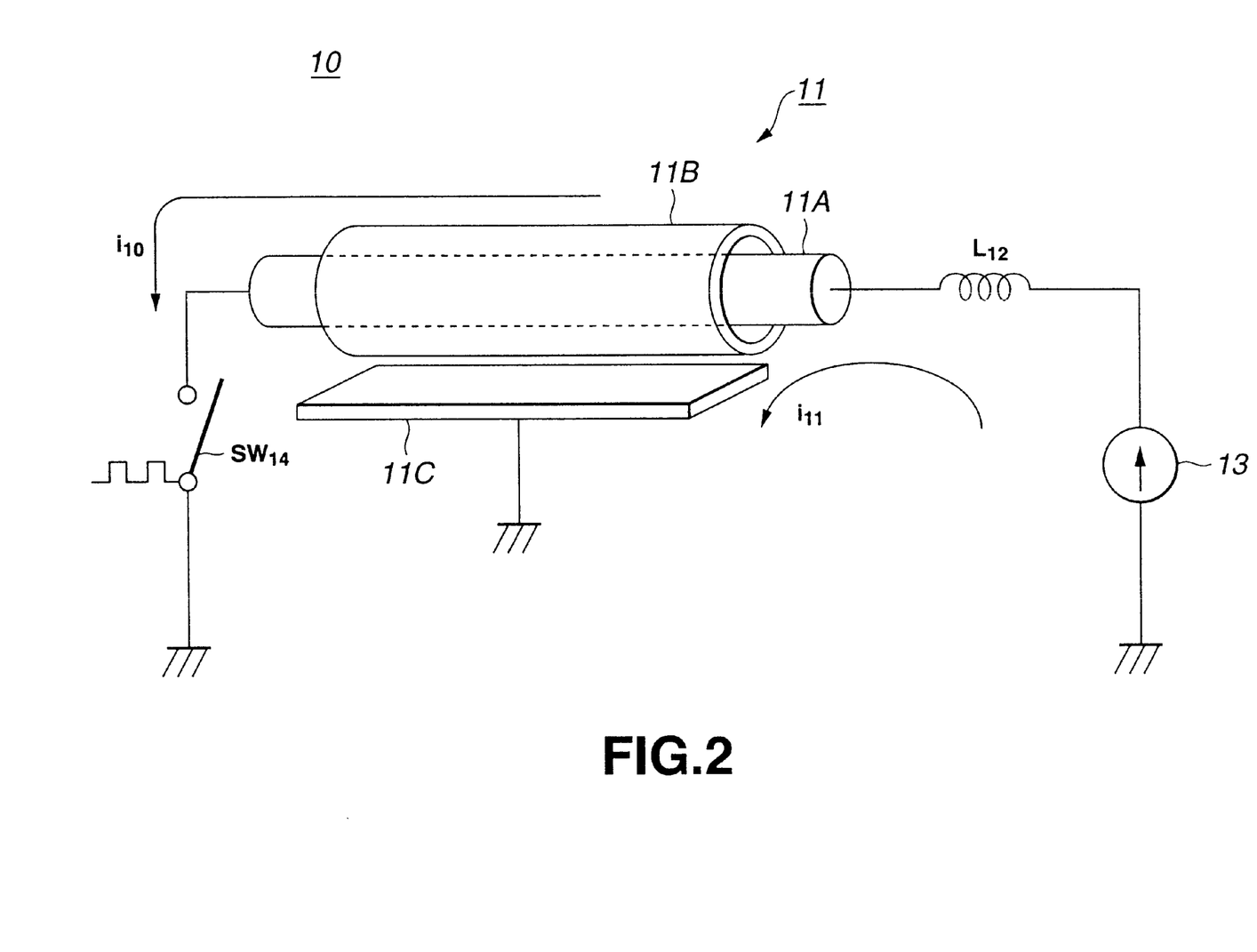
FIG. 2 is a diagram showing an example structure of the preionization discharge circuit shown in FIG. 1.

According to the sixth aspect of the invention, preionization electrode (corresponding to the above preionization electrode) 11 is comprised of electrode 11A which is a conductor (e.g., metal), cylindrical tube 11B as a dielectric through which the electrode 11A is inserted, and continuity plate 11C which is disposed to face the tube 11B so to enable preionization of the main discharge gap 3 (see FIG. 1) across the main discharge electrodes 1, 2 and is grounded as shown in FIG. 2.

In the preionization discharge circuit (corresponding to the above preionization means) 10 having the preionization electrode 11, constant current source 13 is connected to one end of coil L12, the other end of the coil L12 is connected to one end of the electrode 11A of the preionization electrode 11, and the other end of the electrode 11A is connected to switch SW14.

According to the sixth aspect of the invention, the electrode 11A can also be used as a part of the induction type energy accumulation means, and when the switch SW14 is changed from on to off, a uniform electric field is produced in the electrode 11A in its longitudinal direction. Therefore, the corona discharge can be obtained with a uniform electric field intensity at the preionization electrode 11 in its longitudinal direction.

DETAILED DESCRIPTION OF THE PREFERRED EMBODIMENTS

Embodiments of the present invention will be described with reference to the attached drawings.

FIG. 1 shows an equivalent circuit of a capacity shift type magnetic compression discharge device to which the discharge device for pulsed laser of the present invention is applied.

The equivalent circuit shown in FIG. 1 has a structure similar to that of the conventional equivalent circuit shown in FIG. 8 except that the preionization capacitor Cpp and the preionization electrode 4 were removed and the preionization discharge circuit 10, the laser controller 20, the temperature sensor 30 and the preionization discharge control section 40 were added. In FIG. 1, like reference numerals are allocated to like components having the same functions as those of the components shown in FIG. 8.

The preionization discharge circuit 10 is configured independent of the equivalent circuit of the discharge device for pulsed laser having the structure with the preionization capacitor Cpp and the preionization electrode 4 removed from FIG. 8. The equivalent circuit configured with the preionization capacitor Cpp and the preionization electrode 4 removed will be called the main discharge circuit section hereinafter.

Specifically, the preionization discharge circuit 10 has a circuit structure independent of the aforesaid main discharge circuit section.

In the equivalent circuit of the preionization discharge circuit 10, the preionization electrode 11 having the same function as that of the preionization electrode 4 shown in FIG. 8, the coil L12 as an induction type energy accumulation circuit and the constant current source 13 are connected in series. And, the switch SW14, which is a switching element such as an insulated gate bipolar transistor (IGBT), a gate turn-off thyrister (GTO thyrister) or a thyratron to make a switching operation according to the predetermined timing, is connected in parallel to the preionization electrode 11.

A specific example of the structure of the preionization discharge circuit 10 is shown in FIG. 2.

In FIG. 2, the preionization electrode 11 is comprised of the electrode 11A which is a conductor (e.g., metal), the cylindrical tube 11B as a dielectric through which the electrode 11A is passed, and the electrode plate 11C which is disposed to face the tube 11B so to enable preionization of the main discharge gap 3 across the main discharge electrodes 1 and 2 (see FIG. 1) and also grounded.

The constant current source 13 is connected to one end of the coil L12, the other end of the coil L12 is connected to one end of the electrode 11A of the preionization electrode 11, and the other end of the electrode 11A is connected to the switch SW14.

In the preionization discharge circuit 10, the electrode 11A is also used as a part of the induction type energy accumulation circuit (namely, an inductor).

Then, operations of the preionization discharge circuit 10 will be described.

In the preionization discharge circuit 10 of FIG. 2, when the switch SW14 is turned on, current i10 from the constant current source 13 flows through a loop of the coil L12, the electrode 11A and the switch SW14.

Then, when it is assumed that inductance of the coil L12 is L (unit: H) and a current (namely, current i10) flowing through the coil L12 is I (unit: A), energy EL of $(1/2) \cdot L \cdot I^2$ is accumulated in the coil L12.

And, when the switch SW14 is turned off according to a predetermined signal output from preionization discharge control section 60 to be described in detail afterward, the energy EL accumulated in the coil L12 is suddenly supplied to the electrode 11A of the preionization electrode 11. Then, an electric field is generated between the electrode 11A and the electrode plate 11C, the electric field of the preionization electrode 11 rises to a predetermined preionization start electric field, a corona discharge is generated in the tube 11B as the dielectric of the preionization electrode 11 to flow electric current i11, and the main discharge gap 3 is preionized.

In such a case, because the electrode 11A is used as a part of the induction type energy accumulation circuit, a uniform electric field is generated in a longitudinal direction of the electrode 11A when the switch SW14 is tuned off. Therefore, a corona discharge with a uniform electric field strength is generated at the preionization electrode 11 in its longitudinal direction.

Then, reasons of using the induction type energy accumulation circuit (namely, the coil L12) as means for accumulating energy to generate the preionization discharge, namely the corona discharge will be described.

As described above, the energy $EL=(1/2) \cdot L \cdot I^2$ is accumulated in the coil L12.

On the other hand, when it is assumed that an electrostatic capacity of the preionization capacitor Cpp is C (unit: F) and a charging voltage of the capacitor Cpp is V (unit: V) in the equivalent circuit shown in FIG. 8, energy Ec of $(1/2) \cdot C \cdot V^2$ is accumulated in the preionization capacitor Cpp.

When it is assumed that the energy EL accumulated in the coil L12 is the same as the energy Ec accumulated in the preionization capacitor Cpp, the following expression (1) is set up.

$$(1/2) \cdot L \cdot I^2 = (1/2) C \cdot V^2 \quad (1)$$

And, when energy that is identical to that setting up the above expression (1) is accumulated in the coil L12 and the preionization capacitor Cpp, the coil L12 (namely, the induction type energy accumulation circuit) can have a high voltage build-up rate (dV/dt) as compared with the preionization capacitor Cpp. Therefore, a corona emission intensity to the same input energy can be made high, and further preionization can be caused in the main discharge gap 3.

Thus, as means for accumulating energy needed for causing the corona discharge, the induction type energy accumulation circuit is used in this embodiment.

Figure 3:
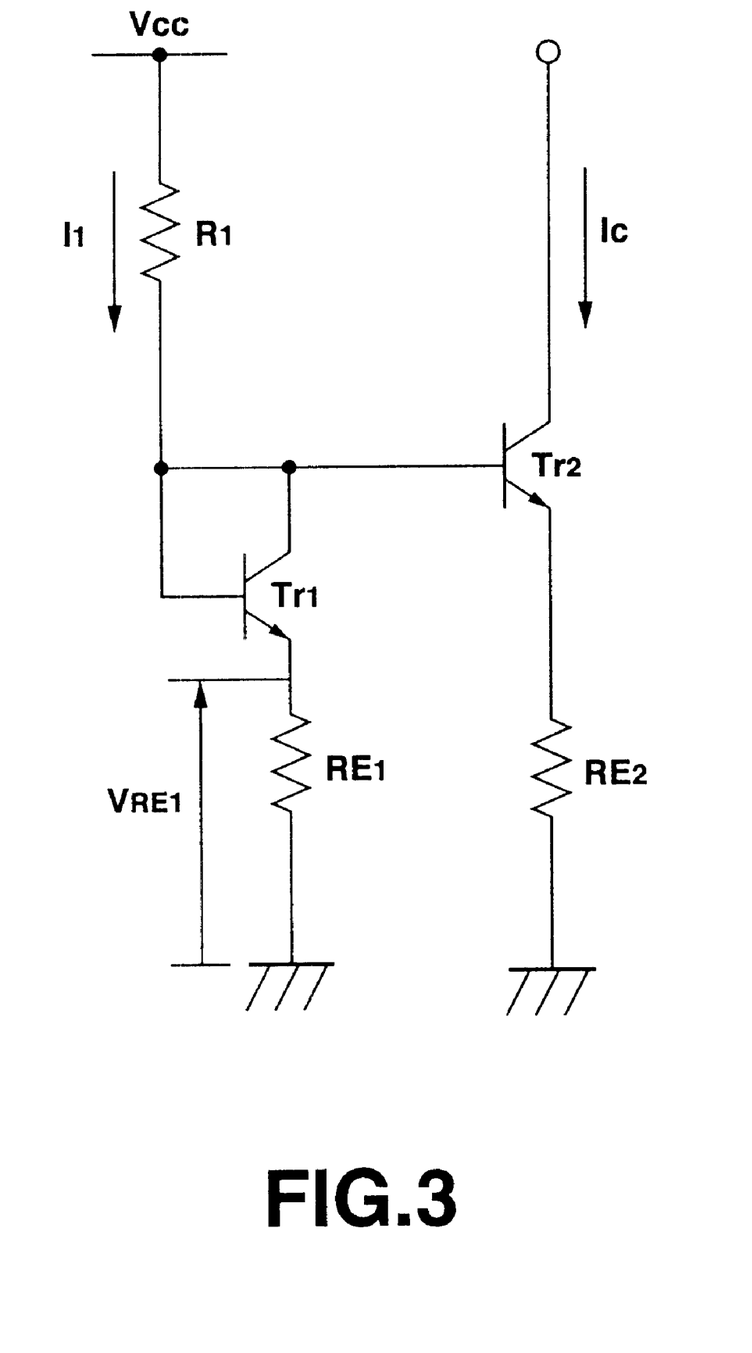
FIG. 3 is a structural diagram showing an example of a constant current source.

FIG. 3 shows an example structure of the constant current source 13.

In the constant current source 13, power-supply voltage Vcc is supplied to a connected portion of a collector and base of transistor Tr1 and a base of transistor Tr2 through resistor R1. Such transistors Tr1, Tr2 have their respective emitters grounded through resistor RE1 and resistor RE2.

Here, collector current Ic flowing to the collector of the transistor Tr2 is determined.

When it is assumed in FIG. 3 that the base electric current of the transistor Tr2 is disregarded and base-to-emitter voltage VBE is equal between the transistors Tr1 and Tr2, current I1 flowing to the resistor R1 and voltage VRE1 at either end of the resistor RE1 are determined by calculating the following expressions (2), (3).

$$\text{Electric current } I1=(Vcc-VBE)/(R1+RE1) \quad (2)$$

$$\text{Voltage } VRE1=I1 \times RE1 \quad (3)$$

Because the voltage at either end of the resistor RE2 is equal to the voltage VRE1, the collector current Ic flowing through the collector of the transistor Tr2 is determined by calculating the following expression (4).

$$\text{Collector current } Ic=VRE1/RE2=(RE1/RE2) \times I1 \quad (4)$$

Thus, when the current I1 flowing through the transistor Tr1 is determined, the collector current Ic flowing to the collector of the transistor Tr2 is determined regardless of the collector voltage and becomes a constant current source.

Descriptions will be further made with reference to FIG. 1. In the equivalent circuit of the main discharge circuit section shown in FIG. 1, a two-stage magnetic pulse compression circuit is used in the same way as the equivalent circuit shown in FIG. 8. Waveforms of voltages VC0, VC1, VC2, VCp and current pulses i0, i1, i2 at the respective components (namely, respective circuit parts) of the main discharge circuit section shown in FIG. 1 are the same as those shown in FIG. 9.

The equivalent circuit of the main discharge circuit section of this embodiment has high voltage source HV, main switch SW, four capacitors C0, C1, C2, Cp, and main discharge electrodes 1, 2.

A first charge transport circuit which forms the electric current loop i0 from the capacitor C0 to the capacitor C1 through magnetic switch AL0 and the main switch SW, a second charge transport circuit which forms the electric current loop i1 from the capacitor C1 to the capacitor C2 through magnetic switch AL1, and a third charge transport circuit which forms the current loop i2 from the capacitor C2 to the peaking capacitor Cp through magnetic switch AL2.

It is designed that inductance become small sequentially when the magnetic switches AL0 to AL2 are saturated or not saturated, and the capacitors of the respective charge transport circuits have the same capacitance. Therefore, the crest value of the electric current pulse which flows through the respective charge transport circuits is amplified sequentially and its pulse width is compressed sequentially as shown in FIG. 9.

In the laser controller 20, energy monitor value Ea output from an unshown energy monitor for monitoring the energy and wavelength of the laser light output from an unshown laser chamber in which the main discharge electrodes 1, 2 are disposed and target energy (namely, energy instruction value) E of laser oscillation output from an unshown exposure device are input to the voltage instruction value arithmetic section 21.

The voltage instruction value arithmetic section 21 calculates voltage instruction value V0, which is needed to output energy corresponding to the energy instruction value E input from the exposure device (not shown), with the energy monitor value Ea input from the energy monitor (not shown) as a feedback signal and outputs the calculated value V0 to the high voltage power source HV and delay time arithmetic section 23.

In this case, an adjustment range of the voltage instruction value V0 is assumed to be minimum voltage value Vmin $\leq$ V0 $\leq$ maximum voltage value Vmax.

In the embodiment, the maximum voltage value Vmax of the power-supply voltage SV0 is determined so that charge transport time through the capacitors C0 to C2 and Cp agrees with saturation time of the magnetic switches AL0 to AL2, in other words, deviations σ0 to σ2 of the saturation time become zero. And the power-supply voltage is controlled in a range not exceeding the maximum voltage value Vmax.

Therefore, a situation that the magnetic switches are saturated when the charge transfer among the capacitors is being made, namely σ1 and σ2 have a negative value, does not take place. Thus, it is securely prevented that the peak value of the electric current pulse lowers and a current-carrying width increases.

Standard delay time setting section 22 and the delay time arithmetic section 23 are configured to agree with respective pulses a duration between the instant when pulse oscillation synchronizing signal (namely, a trigger signal) TR output from an unshown exposure device is received by a gas laser apparatus having the discharge device for pulsed laser and the instant when a laser is actually emitted.

The predetermined standard delay time Tds, which is not less than the maximum value of a varied range of emission delay time between the instant when the main switch SW is turned on and the instant when the laser oscillation is started actually, is previously determined in the standard delay time setting section 22.

In this embodiment, the standard delay time Tds is set to a value under a situation when the temperature is predetermined standard temperature u0 and power-supply voltage V0 to be described afterward is predetermined voltage Vs which is not more than minimum voltage Vmin.

For example, predetermined voltage value Vs($\leq$Vmin), which is equal to or smaller than the minimum voltage Vmin in an adjustment range "Vmin$\leq$V0$\leq$Vmax" of the voltage instruction value V0, is determined at a temperature which is the predetermined standard temperature u0, and oscillation delay time between the instant when the main switch SW is turned on by performing the laser oscillation with the voltage Vs and the instant when the laser oscillation is started actually is determined as the standard delay time Tds. The standard delay time Tds is input to the standard delay time arithmetic section 23 and the preionization discharge control section 40.

The delay time arithmetic section 23 calculates actual emission delay time td when the laser oscillation is conducted with the voltage instruction value V0 according to the input voltage instruction value V0 and also determines a difference between the calculated value (actual emission delay time) td and the standard delay time Tds and outputs the obtained difference as delay time δ(=Tds−td) to temperature compensation section 24.

Specifically, the delay time arithmetic section 23 has data indicating delay times δ corresponding to a plurality of different power-supply voltages V0 previously stored in an unshown memory table. These delay times δ can be determined by previously calculating appropriate values corresponding to the respective power-supply voltages V0 by actually measuring the actual emission delay time td with the respective power-supply voltage V0 varied variously. The obtained delay times δ are stored in correspondence with the power-supply voltages V0 in the memory table. The delay time arithmetic section 23 gets from the memory table the delay time δ corresponding to the voltage instruction value V0 output from the voltage instruction value arithmetic section 21 and outputs it to the temperature compensation section 24.

The voltage instruction value V0 output from the voltage instruction value arithmetic section 21 is always larger than the power-supply voltage Vs used to determined the standard delay time Tds ((V0$\geq$Vs), so that the actual emission delay time td which is estimated by the delay time arithmetic section 23 is always smaller than the standard delay time Tds, and a difference between them is calculated as the delay time δ (namely, obtained from the memory table). In other words, saturation time of the respective magnetic switches AL0 to AL2 is reduced as the power-source voltage V0 is larger. And, the actual emission delay time td becomes short accordingly.

Atmosphere temperature u of the magnetic pulse compression circuit detected by the temperature sensor 30 is input to the temperature compensation section 24.

Reasons of detecting the atmosphere temperature of the magnetic pulse compression circuit by the temperature compensation section 24 in this embodiment will be described.

The emission delay time depends on not only the saturation time of the magnetic switches AL0 to AL2 but also electrifying widths τ0, τ1, τ2 of the current pulses i0, i1, i2. These electrifying widths (charge transport time) τ0, τ1, τ2 are determined according to the capacitance of the capacitors and the inductance of the magnetic switches included in the respective charge transport circuits. Therefore, the emission delay time is influenced by the atmosphere temperature in the magnetic pulse compression circuit.

Accordingly, the atmosphere temperature of the magnetic pulse compression circuit is detected in this embodiment, and the emission delay time is compensated according to the detected result.

Specifically, delay time δ is determined considering variations of the actual emission delay time td due to the atmosphere temperature of the magnetic pulse compression circuit in addition to the power-supply voltage V0, and the pulse oscillation synchronizing signal TR is delayed by the determined delay time δ'. Details will be described afterward.

The temperature compensation section 24 has an unshown memory table for storing data indicating a relation between a plurality of atmosphere temperatures u and a plurality of delay times ∈ (with only a temperature change taken into consideration) corresponding to such atmosphere temperatures.

Specifically, the actual emission delay time td is actually measured with the power-supply voltage V0 assumed to be voltage Vs for setting the standard delay time Tds and the atmosphere temperature u varied variously. And difference ∈ between the actually measured value td and the standard delay time Tds with the power-supply voltage V0 determined to be the voltage Vs at predetermined standard temperature u0 is stored in association with the atmosphere temperature u into the memory table.

The temperature compensation section 24 reads data indicating the delay time ∈ corresponding to the detected value (namely, the atmosphere temperature) u of the temperature sensor 30 from the memory table, adds the read delay time ∈ (namely, the delay time ∈ considering the temperature) to the delay time δ considering only the power-supply voltage input from the delay time arithmetic section 23, and outputs the added result δ'(=δ+∈) as final delay time δ' to the delay section 25.

Pulse oscillation synchronizing signal TR, which is a trigger signal for the repetition pulse oscillation, output from the exposure apparatus (not shown) is input to the delay section 25.

The delay section 25 delays the received pulse oscillation synchronizing signal TR by the aforesaid delay time δ', outputs the delayed pulse oscillation synchronizing signal TRL to the main switch SW, and also outputs the pulse oscillation synchronizing signal TRL and the delay time δ' to the preionization discharge control section 40.

As a result, in each pulse oscillation, the duration from the reception of the pulse oscillation synchronizing signal TR by the delay time arithmetic section 23 to the actual emission of the laser light becomes the actual emission delay time td+the delay time δ'(=standard delay time Tds), which always agrees with a constant value of the standard delay time Tds.

Figure 4:
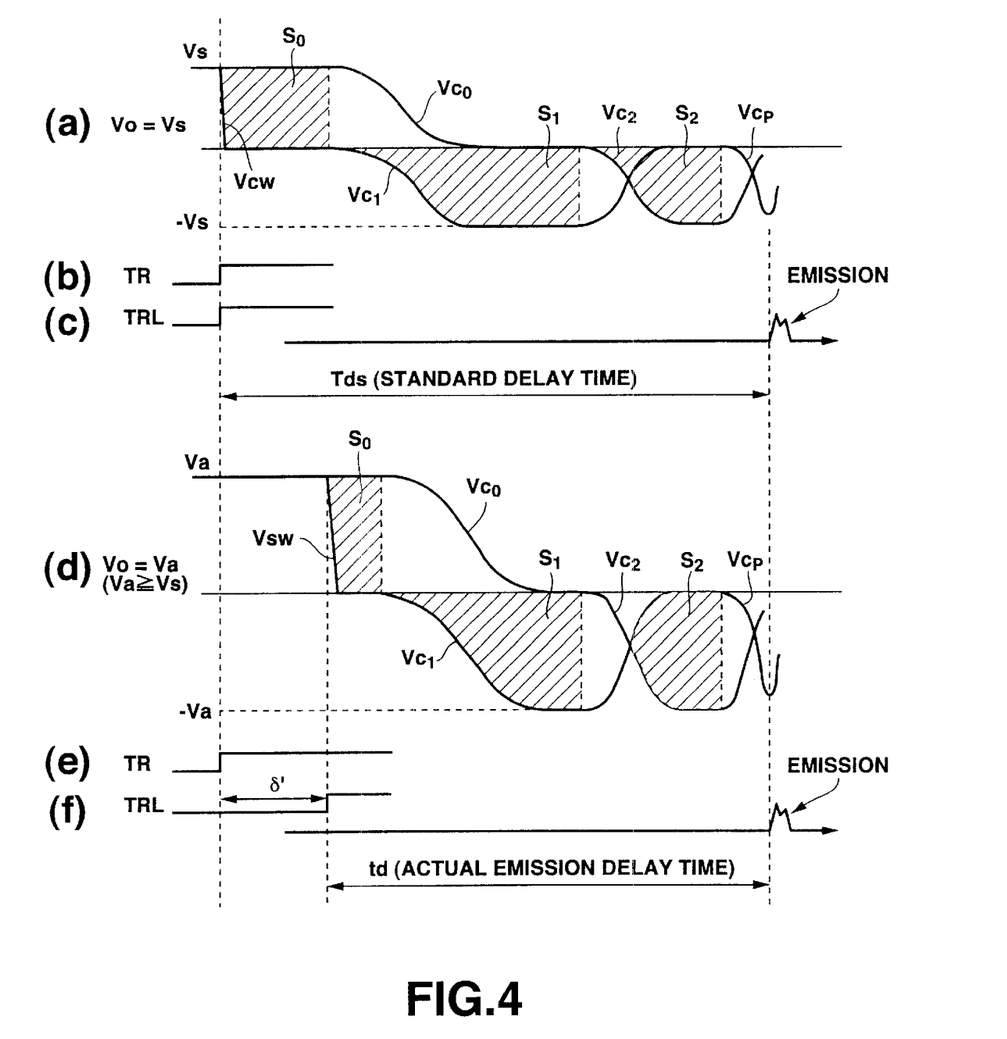
FIG. 4 is a time chart showing voltage waveforms and pulse synchronizing signals at respective points of a magnetic pulse compression circuit to show the operations of the embodiment.

FIG. 4, (*a*) shows voltage waveforms at the respective points of the magnetic pulse compression circuit shown in FIG. 1 when the laser oscillation is conducted with the power-supply voltage V0 determined as the voltage Vs for setting the standard delay time Tds. And, FIG. 4, (*d*) shows voltage waveforms at the respective points of the magnetic pulse compression circuit when the laser oscillation is conducted with the power-supply voltage V0 determined as predetermined voltage Va higher than the aforesaid voltage Vs. The time axis is common between the above figures.

It is apparent by comparing the above voltage waveforms that when the initial charging voltage (instruction voltage) V0 becomes large, voltage-by-time product portions (S1, S1, S2) are shrunk along the time axis, and the magnetic switches AL0, AL1 have a short saturation time.

Therefore, when the initial charging voltage V0 is the small voltage Vs as shown in FIG. 4, (*a*), it takes the standard delay time Tds from the input of the pulse oscillation synchronizing signal TR to the main switch SW to the actual emission of the laser (see FIG. 4, (*c*)), but when the initial charging voltage V0 is the large voltage Va as shown in FIG. 4, (*d*), it takes only time td (<Tds) from the input of the pulse oscillation synchronizing signal TR to the main switch SW to the actual emission of the laser (see FIG. 4, (*f*)).

The preionization discharge control section 40, which has received the pulse oscillation synchronizing signal TRL and the delay time δ' output from the delay section 25, controls to switch the switch SW 14 of the preionization discharge circuit 10 according to the pulse oscillation synchronizing signal TRL and the delay time δ' so to preionize the main discharge gap 3 before the main discharge is made by the main discharge electrodes 1, 2.

Specifically, the preionization discharge control section 40 has a memory for storing data which indicates the standard delay time Tds already output from the standard delay time setting section 22, recognizes that a value obtained by subtracting the delay time δ' from the standard delay time Tds is the actual emission delay time td and that a value obtained by adding the actual emission delay time td from the rising moment of the pulse oscillation synchronizing signal TRL is the moment when the laser light is emitted.

And, when the preionization discharge control section 40 recognizes that the laser is emitted after a lapse of the actual emission delay time td (=the standard delay time Tds−the delay time δ') as shown in FIGS. 5(*b*), (*c*) from the rising moment of the pulse oscillation synchronizing signal TRL as shown in FIG. 5, (*a*), it outputs preionization discharge timing signal Ydt to the main switch SW14 so that the preionization discharge (namely, the corona discharge) is performed earlier by predetermined time tyd than the moment of the laser emission as shown in FIGS. 5, (*d*), (*e*) (see FIG. 5, (*d*)).

The preionization discharge timing signal Ydt is sent from the preionization discharge control section 40 to the switch SW14 so that the switch SW14 is changed from the on state to the off state after a lapse of time ty (=Tds−tyd) obtained by subtracting the predetermined time tdy from the standard delay time Tds from the moment when the pulse oscillation synchronizing signal TRL is received.

The predetermined time tyd is determined to be a duration from the start of the preionization by the preionization electrode 11 to the full preionization of the main discharge gap 3.

Then, reasons of setting the predetermined time tyd will be described with reference to FIG. 6.

Figure 6:
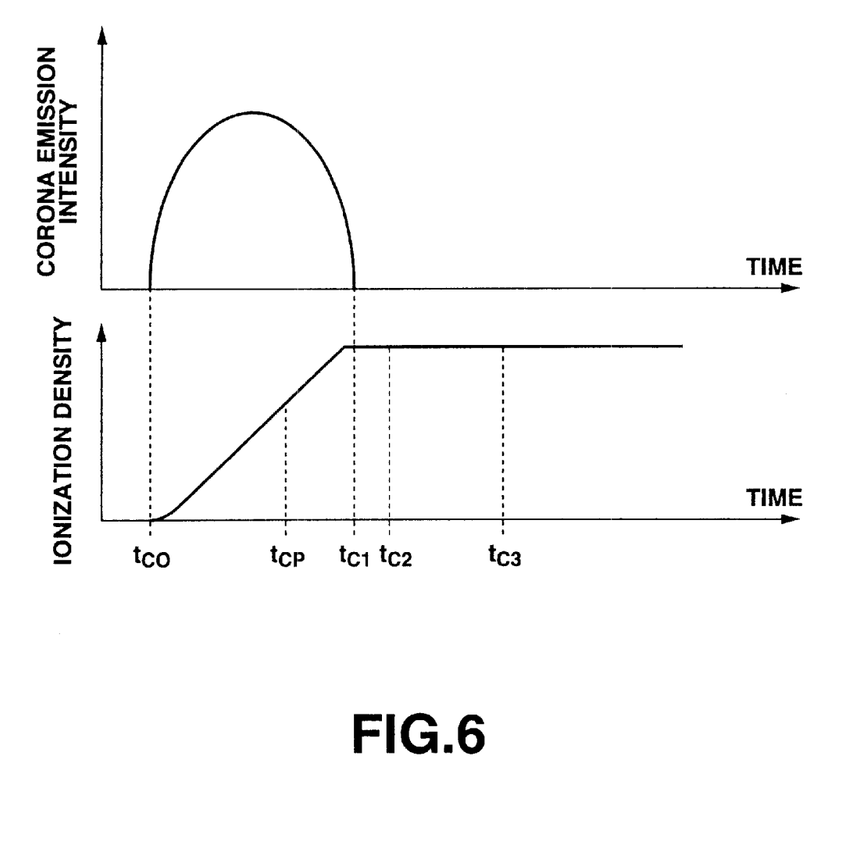
FIG. 6 is a characteristic diagram showing a relationship between a corona emission strength and an ionizing density at preionization discharging by a preionization electrode.

FIG. 6 is a characteristic diagram showing a relationship between an intensity of corona emission (namely, corona emission intensity) and an ionization density by the preionization discharge (namely, the corona discharge).

Time tC0 on the time axis shown in FIG. 6 corresponds with the rising point of the preionization discharge timing signal Ydt shown in FIG. 5, (*d*), namely time ts shown in FIG. 5, (*e*). And time tC1 shown in FIG. 6 corresponds with the time te shown in FIG. 5, (*e*).

The ionization density increases gradually in the duration from the time tC0 when the corona discharge is started as shown in FIG. 6 to the time tc1 when the corona discharge is terminated (namely, the period when the corona discharge is performed) and keeps a predetermined value for a predetermined period even after the corona emission is terminated at the time tC1.

Besides, the main discharge gap 3 is preionized sufficiently at a predetermined moment after the time tC1. The sufficient preionization of the main discharge gap 3 means that electron density Ne0 generated by the preionization has reached such a predetermined value that a stable glow discharge (main discharge) is made and maintained with ease. Therefore, the main discharge is caused readily and stabilized in the aforesaid preionizing state (predetermined electron density Ne0).

For example, when the corona discharge period (from the time tC0 to the time tC1) is 100 nsec, the preionization discharge control section 40 of this embodiment, assuming that at least the predetermined time tyd=the corona discharge period=100 nsec, outputs the preionization discharge timing signal (namely, the corona emission timing signal) Ydt to the switch SW14 after a lapse of the time ty (=Tds−tyd) upon receipt of the pulse oscillation synchronizing signal TRL as described above so that the preionization discharge is caused earlier by the time tyd (=100 nsec) than the rising moment of the emission timing signal Ht of the laser emission shown in FIG. 5, (*b*).

Thus, when the main discharge is caused by the main discharge electrodes 1, 2 at the time tC1 when the corona emission is terminated, the main discharge is performed in the sufficiently preionized state, so that the main discharge is caused readily and stabilized.

When the corona discharge period is 100 nsec and the predetermined time tyd is 100 nsec+several nsec, the preionization discharge control section 40 may send to the switch SW14 the preionization discharge timing signal Ydt with timing earlier by the time tyd (=100 nsec+several nsec) than the emission timing signal Ht of the aforesaid laser light.

In such a case, for example even when the main discharge is caused by the main discharge electrodes 1, 2 at time tC2 or time tC3 shown in FIG. 6, sufficient preionization is caused in the main discharge gap 3, so that the main discharge is readily caused and also stabilized in the same way as the main discharge is caused at the time tC1.

In the conventional discharge device for pulsed laser as shown in FIG. 8, the corona discharge is caused by charging the preionization capacitor Cpp in synchronization with the charging of the peaking capacitor Cp. Therefore, the time t6 (namely, the main discharge start moment) shown in FIG. 9 often corresponds with for example the time tCp shown in FIG. 6. In other words, the main discharge is conventionally caused by the main discharge electrodes 1, 2 in an insufficient preionizing state (namely, during the preionization), so that the main discharge is hardly caused and unstable.

In the aforesaid embodiment, the switch SW14 of the preionization discharge circuit 10 is disposed between one end of the electrode 11A in the preionization electrode 11, whose other end is connected to the coil L12, and a ground, but the invention is not limited to such a configuration. The switch SW14 may also be disposed as follows.

Figure 7:
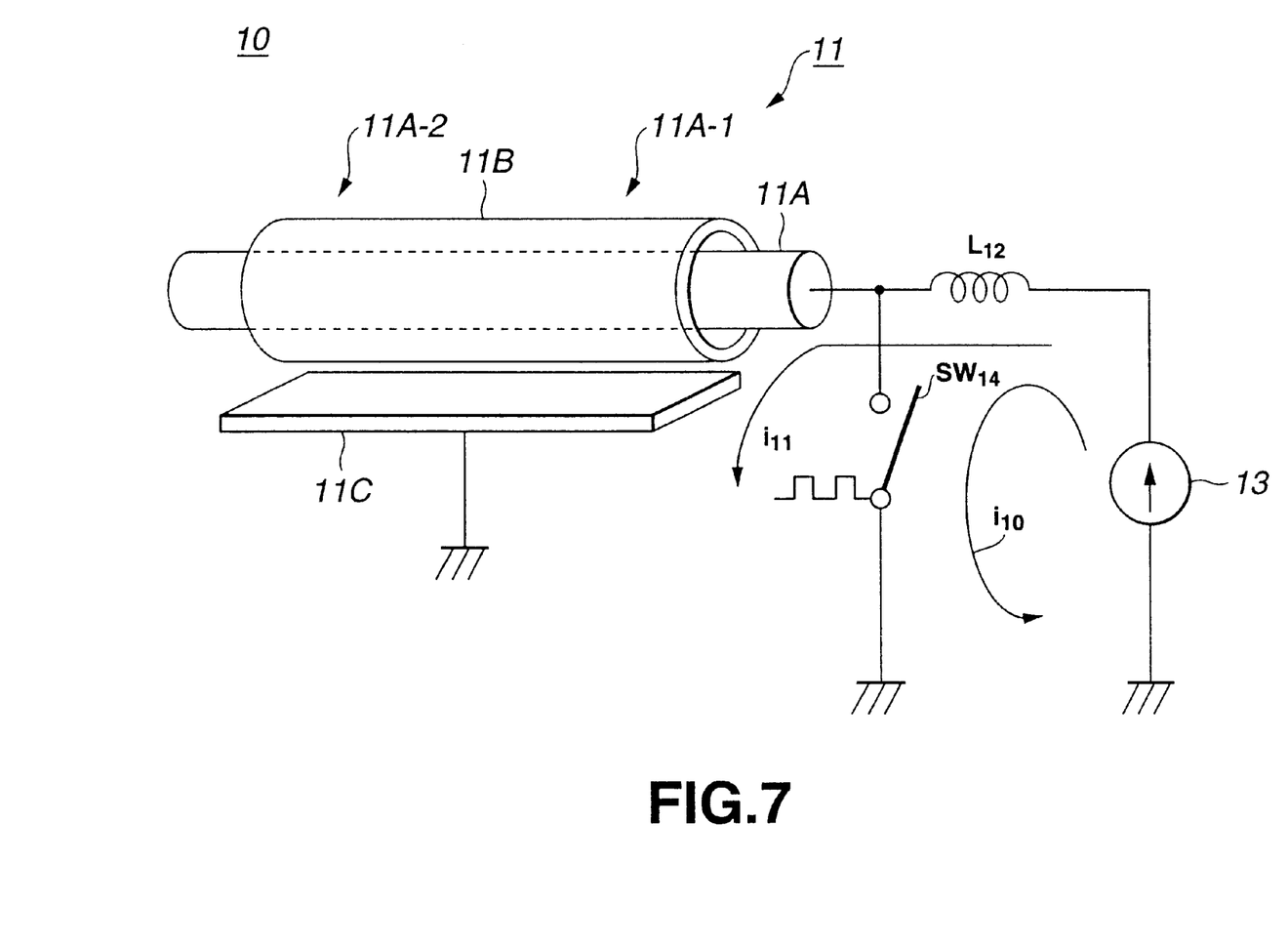
FIG. 7 is a structural diagram showing a structure of another preionization discharge circuit of the embodiment.

Specifically, the switch SW14 may be disposed between a ground and a connecting point where the electrode 11A of the preionization electrode 11 and the coil L12 are connected as shown in FIG. 7.

The preionization discharge circuit 10 configured as shown in FIG. 7 is independent of the aforesaid main discharge circuit section, so that the emission timing of the preionization discharge or the corona discharge can be determined arbitrarily.

But, the electrode 11A has an electric field strength in the vicinity of portion 11A-1 close to the coil L12 larger than that in the vicinity of portion 11A-2 away from the coil L12. In other words, because the electric field strength is different between the vicinity of the portion 11A-1 and the vicinity of the portion 11A-2, the electric field strength become uneven with respect to the entire electrode 11A or its longitudinal direction, and the corona discharge also becomes uneven. As a result, the preionization becomes uneven in the main discharge gap 3 and particularly in the main discharge gap 3 in the longitudinal direction of the main discharge electrodes 1, 2. And there is a possibility that the main discharge is not caused by the main discharge electrodes 1, 2.

Therefore, it is preferable to adopt the preionization discharge circuit 10 shown in FIG. 2 from the viewpoint that a uniform electric field strength is produced in the longitudinal direction of the electrode 11A and the emission timing of the preionization discharge or the corona discharge can be determined arbitrarily.

In the aforesaid embodiment, the preionization discharge control section 40 recognizes a value obtained by subtracting the delay time δ' from the standard delay time Tds as the actual emission delay time td and a value obtained by adding the actual emission delay time td from the rising moment of the pulse oscillation synchronizing signal TRL as the emission moment of the laser light. But, the invention is not limited to the above configuration and may also be configured as follows.

Specifically, the standard delay time Tds determined by the standard delay time setting section 22 is not sent to the preionization discharge control section 40 but to the delay section 25.

And, the delay section 25 recognizes that a value obtained by adding the actual emission delay time (Tds−δ'=td) from the rising moment of the pulse oscillation synchronizing signal TRL is the emission moment of the laser light according to the standard delay time Tds, the delay time δ' determined by it and the pulse oscillation synchronizing signal TRL generated by it, and outputs the emission timing signal of the laser light to the preionization discharge control section 40.

The preionization discharge control section 40 outputs the preionization discharge timing signal Ydt to the switch SW14 so that the preionization discharge (namely, the corona discharge) is caused earlier by the predetermined time tyd than the rising moment of the emission timing signal of the laser light.

As described above, the preionization discharge circuit section 10 and the aforesaid main discharge circuit section have an independent discharge system in this embodiment, so that the emission timing of the preionization discharge (namely, the corona discharge) is not limited to that of the main discharge but can be determined arbitrarily.

Therefore, the emission timing of the corona discharge can be determined so that the main discharge is caused with the main discharge gap 3 in a fully preionized state. Thus, the laser oscillation can be optimized accordingly.

According to this embodiment, the induction type energy accumulation means is used, and the voltage rising rate (dV/dt) can be made high. Thus, the corona emission intensity to the input energy can be made high as compared with the capacity type energy accumulation means (namely, the capacitor).

Besides, the electrode 11A of the preionization electrode 11 of this embodiment is used as a part of the induction type energy accumulation means (namely, the inductor), so that when the switch SW14 is changed from on to off, a uniform electric field is produced in the longitudinal direction of the electrode 11A, and the preionization electrode 11 can obtain the corona discharge (namely, the corona emission) with the uniform electric field intensity in its longitudinal direction.

Furthermore, the electrode 11A of the preionization electrode 11 is also used as a part of the induction type energy accumulation means (namely, the inductor) in the embodiment as described above, so that the induction type energy accumulation means of this embodiment can make the actual inductor (namely, the coil L12) smaller and lighter for the inductance possessed by the electrode 11A as compared with the induction type energy accumulation means in the case that the electrode 11A is not used as the inductor.

What is claimed is:

1. A discharge device for a pulsed laser, comprising a main discharge means having main discharge electrodes disposed in a laser medium, a main discharge capacitor connected in parallel with the main discharge electrodes, a magnetic pulse compression circuit which is connected in parallel with the main discharge capacitor and has a saturable reactor connected in series with a forwarding capacitor, and a power source for supplying electric charges to the forwarding capacitor, said capacitor generating a pulsed laser by transferring the electric charges accumulated in the forwarding capacitor according to a preset pulse oscillation synchronizing signal from an outside source to the main discharge capacitor to cause a pulse discharge across the main discharge electrodes so as to excite the laser medium, wherein:

preionization means for causing preionization across the main discharge electrodes is disposed to discharge independent of the main discharge means; and preionization is caused across the main discharge means by the preionization means before the main discharge is caused by the main discharge means.

2. The discharge device for pulsed laser according to claim 1, wherein the preionization means comprises:

a preionization electrode;

induction type energy accumulation means for accumulating energy to cause a preionization discharge by the preionization electrode;

supply means for supplying energy to the energy accumulation means; and switching means to connect the supply means to the energy accumulation means in correspondence with the pulse oscillation synchronizing signal and to supply the energy accumulated in the energy accumulation means to the preionization electrode.

3. The discharge device for pulsed laser according to claim 2, wherein:

the preionization means has the switching means, the preionization electrode, the energy accumulation means and the supply means connected in series; and one end of the preionization electrode is connected to the switching means and the other end of the preionization electrode is connected to the energy accumulation means.

4. The discharge device for pulsed laser according to claim 1, further comprising:

predicting means for predicting a start moment of a main discharge by the main discharge electrodes; and control means for controlling the preionization means so that preionization is caused across the main discharge electrodes earlier by a preset time than the start moment of the main discharge predicted by the predicting means.

5. The discharge device for pulsed laser according to claim 2, further comprising:

predicting means for predicting a start moment of the main discharge by the main discharge electrodes; and control means for controlling the switching means so that preionization is caused across the main discharge electrodes earlier by a certain time than the start moment of the main discharge predicted by the predicting means.

6. The discharge device for pulsed laser according to claim 1, wherein the predicting means comprises:

voltage compensating means for compensating variations in an actual emission moment of the pulsed laser due to a change in a power-supply voltage depending on a voltage instruction value to the power source;

temperature compensating means for compensating variations in the actual emission moment of the pulsed laser due to a change in an atmosphere temperature in the magnetic pulse compression circuit; and actual emission moment predicting means for predicting the actual emission moment of the pulsed laser according to the actual emission moment compensated by the voltage compensating means and the actual emission moment compensated by the temperature compensating means; and wherein the predicting means recognizes the actual emission moment predicted by the actual emission moment predicting means as a start moment of the main discharge.

* * * * *